United States Patent
Epstein et al.

(10) Patent No.: US 9,426,949 B1
(45) Date of Patent: Aug. 30, 2016

(54) SYSTEMS AND APPARATUS FOR EXTRACTING AND DELIVERING NUTRIENTS FROM BIOMASS FOR PLANT GROWTH

(71) Applicants: David A. Epstein, Atlanta, GA (US); Kenneth W. Lovell, Atlanta, GA (US)

(72) Inventors: David A. Epstein, Atlanta, GA (US); Kenneth W. Lovell, Atlanta, GA (US)

(*) Notice: Subject to any disclaimer, the term of this patent is extended or adjusted under 35 U.S.C. 154(b) by 258 days.

(21) Appl. No.: 13/680,073

(22) Filed: Nov. 18, 2012

Related U.S. Application Data

(60) Provisional application No. 61/562,330, filed on Nov. 21, 2011.

(51) Int. Cl.
*A01G 9/02* (2006.01)
*A01G 31/06* (2006.01)
*A47G 7/02* (2006.01)

(52) U.S. Cl.
CPC .............. *A01G 31/06* (2013.01); *A01G 9/023* (2013.01); *A47G 7/02* (2013.01)

(58) Field of Classification Search
CPC ........... A01G 9/023; A01G 2031/006; A01G 31/06; A01G 33/00; A47G 7/02; A47G 7/041
USPC ..... 47/59 R, 62 C, 62 E, 62 N, 62 R, 63, 82, 47/83, 39, 1.4
See application file for complete search history.

(56) References Cited

U.S. PATENT DOCUMENTS

| | | | |
|---|---|---|---|
| 2,952,096 A * | 9/1960 | Hughes et al. ................ 47/60 |
| 3,772,827 A * | 11/1973 | Ware ............................... 47/39 |
| D237,898 S * | 12/1975 | Austin et al. ............... D11/144 |
| 4,077,158 A * | 3/1978 | England ....................... 47/59 R |
| 4,163,342 A * | 8/1979 | Fogg et al. ................ 47/58.1 R |
| 4,170,844 A * | 10/1979 | Steele ........................... 47/62 R |
| 4,397,114 A * | 8/1983 | Skaife .............................. 47/81 |
| 4,603,506 A * | 8/1986 | Powell, Jr. ................... 47/62 E |
| 5,381,626 A * | 1/1995 | Sherfield ............... A01G 31/02 47/20.1 |
| 5,570,547 A * | 11/1996 | Webb et al. .................... 52/194 |
| 5,675,932 A * | 10/1997 | Mauney ....................... 47/62 R |
| 5,856,190 A * | 1/1999 | Iwai et al. .................... 435/420 |
| 6,082,044 A * | 7/2000 | Sherfield ...................... 47/62 R |
| 6,119,392 A * | 9/2000 | Lais ................... A01G 13/0243 47/29.2 |

(Continued)

FOREIGN PATENT DOCUMENTS

| | | | |
|---|---|---|---|
| JP | 05000032 A * | 1/1993 | ............. A01G 31/00 |
| JP | 2004073003 A * | 3/2004 | ............. A01G 31/00 |

(Continued)

*Primary Examiner* — Son T Nguyen

(57) ABSTRACT

Certain embodiments of the disclosed technology may include systems and apparatus for extracting and delivering nutrients from biomass for plant growth. In an example implementation, an apparatus is provided for supporting a multi-level system for extracting and distributing nutrients from biomass for plant growth, the apparatus includes two or more support structures. Each support structure includes two or more vertical strength members disposed substantially vertically on opposing sides of a corrugated base cylinder and are stabilized by at least one corrugations associated with the base cylinder. The apparatus includes two or more horizontal retaining members in communication with the respective two or more vertical strength members and operable to secure the two or more vertical strength members against the base cylinder. The apparatus also includes one or more upper troughs supported by the two or more support structures and disposed in a substantially horizontal position.

11 Claims, 9 Drawing Sheets

(56) References Cited

U.S. PATENT DOCUMENTS

| | | | |
|---|---|---|---|
| 6,840,007 B2* | 1/2005 | Leduc et al. | 47/62 C |
| 8,215,059 B2* | 7/2012 | Williams | 47/86 |
| 2003/0024159 A1* | 2/2003 | Nakamura | 47/39 |
| 2005/0039390 A1* | 2/2005 | Sharples et al. | 47/39 |
| 2007/0011944 A1* | 1/2007 | Triantos | 47/62 R |
| 2014/0165468 A1* | 6/2014 | Roeser et al. | 47/62 R |

FOREIGN PATENT DOCUMENTS

| | | | | |
|---|---|---|---|---|
| JP | 2007167033 A | * | 7/2007 | |
| WO | WO 8103257 A1 | * | 11/1981 | A01G 31/02 |
| WO | WO 2004084621 A1 | * | 10/2004 | A01G 31/02 |
| WO | WO 2005077152 A1 | * | 8/2005 | A01G 31/06 |

* cited by examiner

SYSTEMS AND APPARATUS FOR EXTRACTING AND DELIVERING NUTRIENTS FROM BIOMASS FOR PLANT GROWTH

RELATED APPLICATIONS

This application is related to provisional application Ser. No. 61/562,330, filed on Nov. 21, 2011, entitled: "Bioponica™ Systems including BioGarden™ System, Incubator™ System and other Fish and Plant Production System Variations," the contents of which are hereby incorporated by reference in their entirety.

BACKGROUND

As humans are becoming more conscious of the food they eat, how that food is fertilized, how it is harvested, how it is transported, and how it affects the planet, many are beginning see the value and urgency of controlling at least a portion their food supply by growing their own food.

Certain large-scale agricultural processes are often designed to maximize production and profits without holistic considerations of the natural resources used in the production cycles. For example, nitrogen-based fertilizers (often derived from fossil fuels) are routinely added to soil to maximize plant growth—but at a cost to the long-term viability of the soil. Fossil fuels are also used in transporting crops over long distances. Growing food near the location where it is consumed helps reduce transport costs, and it often provides a direct connection between the consumer and the farmer, particularly when the consumer is the farmer.

One of the challenges faced in modern society with growing urban population centers is the limited growing space available for crop production. The estimated land area needed to sustain one person ranges from about an acre to about 10 square miles, depending on the climate, number of growing seasons, and diet. However, many modern families don't have access to such large areas for farming, hunting, and gathering areas, so many continue to be dependent on the large-scale industrial farming complex for their nutrition.

BRIEF SUMMARY

Some or all of the above needs may be addressed by certain embodiments of the disclosed technology. Certain embodiments of the disclosed technology may include systems and methods for extracting and delivering nutrients from biomass for plant production.

According to an example embodiment of the disclosed technology, a multi-level system is provided for extracting and distributing nutrients from biomass for plant growth. The system may include one or more substantially hollow elongated base cylinders, each base cylinder having a longitudinal axis extending from a first end to a second end and disposed in a substantially horizontal position, each base cylinder defining an inner surface having an inner radius about the longitudinal axis and a plurality of corrugations defining an outer surface, the corrugations comprising maxima radius and minima radius disposed periodically along the longitudinal axis. The system may also include a first vertical support structure disposed approximate at least one of the one or more base cylinders first end and a second vertical support structure disposed approximate at least one of the one or more base cylinders second end.

Each of the vertical support structures include two or more vertical strength members disposed substantially on opposing sides of the base cylinder and perpendicular to the longitudinal axis and in contact with the base cylinder. The two or more vertical strength members are disposed substantially against the outer surface of at least one of the base cylinders and adjacent the outer surface minima radius within a corrugations. The two or more vertical strength members are stabilized in at least a dimension perpendicular to the longitudinal axis by the corrugation.

The system may also include a first horizontal support structure in communication with the first vertical support structure and a second horizontal support structure in communication with the second vertical support structure. The horizontal support structure may be disposed substantially perpendicular to the longitudinal axis and may be disposed above the one or more base cylinder. The horizontal support structures may be stabilized in at least a dimension parallel to the longitudinal axis by interaction of the vertical support structures with at least one of the plurality of corrugations. The system may further include one or more upper or top troughs supported by the horizontal support structures and disposed in a substantially horizontal position above the one or more base cylinders.

According to an example implementation of the disclosed technology, an apparatus is provided for supporting a multi-level system for extracting and distributing nutrients from biomass for plant growth. The apparatus includes two or more support structures, each support structure including two or more vertical strength members disposed substantially vertically on opposing sides of a corrugated base cylinder. The two or more vertical strength members may be disposed substantially against an outer surface of the base cylinder and substantially perpendicular to a longitudinal axis of the base cylinder. The two or more vertical strength members are stabilized in at least a dimension perpendicular to the longitudinal axis by at least one corrugation associated with the base cylinder. Each support structure also includes two or more horizontal retaining members in communication with the respective two or more vertical strength members. The horizontal retaining members are operable to secure the two or more vertical strength members against the base cylinder. The horizontal retaining members are disposed substantially perpendicular to the longitudinal axis and are disposed on opposing sides of the base cylinder. The horizontal retaining members are stabilized in at least a dimension parallel to the longitudinal axis by interaction with at least one of the plurality of corrugations. The apparatus also includes one or more upper troughs supported by the two or more support structures. The upper troughs are disposed in a substantially horizontal position above the one or more base cylinders.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. References to "one embodiment," "an embodiment," "example embodiment," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments of the disclosed technology may include various systems, apparatus, and methods that provide for a modular, scalable, soil-less aquaponic or hydroponic functioning garden system. Certain example implementations include multi-level, vertically stacked components that may be integrated or expanded. One feature of the disclosed technology includes interlocking frame members that may utilize corrugations in a lower corrugated pipe tank or trough to provide structural integrity to the system. According to certain example embodiments, galvanized steel or aluminum metal frame members may be utilized as frame members. In certain example embodiments, longitudinal and/or horizontal timbers may be utilized to further secure components to the frame structure. These elements may define the structural integrity and ease of building the system in a vertical fashion, and will be further explained with the aid of the accompanying figures.

Biogarden Systems

Figure 1:
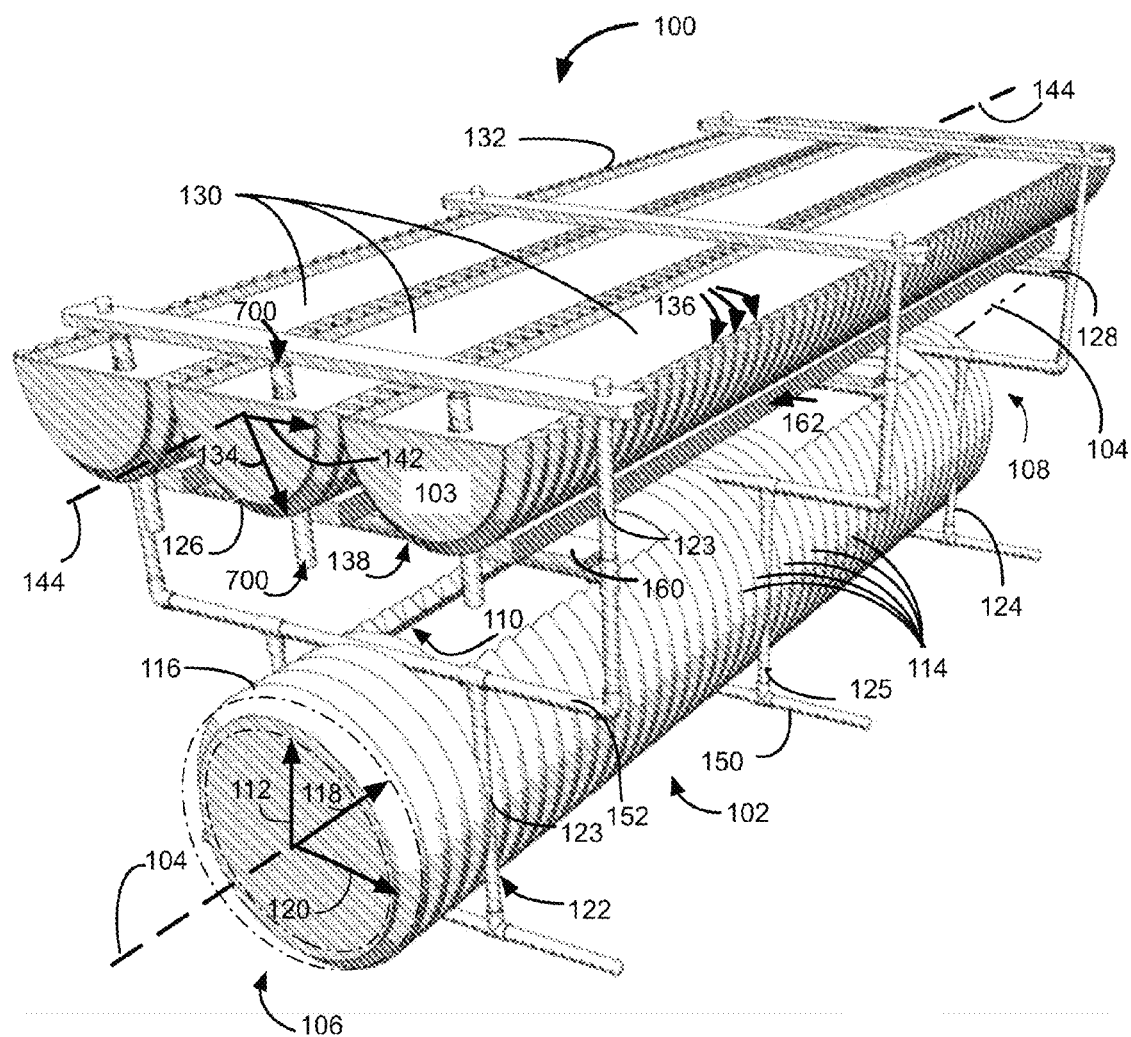
FIG. 1 is a perspective rendering of a two-level system for extracting and distributing nutrients from biomass for plant growth, according to an example implementation of the disclosed technology.

FIG. 1 depicts a 2-level system 100 for extracting and distributing nutrients from biomass for plant growth, according to an example implementation of the disclosed technology. The example system 100, as shown, includes a substantially hollow elongated base cylinder 102, having end caps for sealing both ends of the cylinder. In certain example embodiments, the base cylinder 102 may be utilized for containing water, biomass, nutrients, fish, etc. The nutrients, for example, may be transferred to the water from the biomass, fish feces, or other nutrient sources, and the nutrient-rich water 130 may be delivered via pumps, tubes, valves, etc., to upper levels of the system for sustaining plant growth. In certain example embodiments, gravity may be utilized wherever convenient for returning the water to the base cylinder 102 for recycling and introduction of additional nutrients. The gravity recycling of the water may enabled, at least in part, by the vertical stacking of the upper level troughs above the base cylinder 102.

According to an example implementation, the base cylinder 102 may be made from high-density polyethylene (HDPE). Other materials may be used for the base cylinder 102 without departing from the scope of the technology, including but not limited to, polyvinyl chloride (PVC), metal, plastic, wood, and concrete. In an example implementation, the external surface of the base cylinder 102 may include corrugations 114. According to example implementations, the corrugations 114 may provide certain strength and stability benefits, and may be utilized for constraining some of the other system strength members, as will be further discussed below.

According to an example implementation, the base cylinder 102 may be defined by a longitudinal axis 104 extending from the base cylinder's 102 first end 106 to a second end 108, and the base cylinder 102 may be disposed in a substantially horizontal position. For example, in one embodiment, the base cylinder 102 may be placed on the ground. According to an example implementation, the base cylinder 102 may include an inner surface 110 having an inner radius 112 about the longitudinal axis 104 and a plurality of corrugations 114 defining an outer surface 116. According to an example implementation, the corrugations 114 in the base cylinder 102 may define a maxima 118 radius and minima 120 radius disposed periodically along the longitudinal axis 104.

An example implementation of the disclosed technology may include a first vertical support structure 122 disposed near the first end 106, and a second vertical support structure 124 disposed near a second end 108 of the base cylinder 102. According to an example implementation, the vertical support structures 122 124 may include two or more vertical strength members 123 disposed substantially on opposing sides of the base cylinder 102 and perpendicular to the longitudinal axis 104 and in contact with the base cylinder 102. According to an example implementation, the two or more vertical strength members 123 may be disposed substantially against the outer surface 116 of the base cylinder 102 and adjacent the outer surface 116 minima radius 120 within a corrugation 114. In an example implementation, this placement of the two or more vertical strength members 123 against the corrugation 114 may provide stability in at least a dimension perpendicular to the longitudinal axis 104.

As shown in FIG. 1, the system 100 may include a third vertical support structure 125 disposed approximately between first end 106 to the second end 108 wherein the third vertical support structures 125 comprises two or more vertical strength members 123 disposed substantially on opposing sides of the base cylinder 102 and perpendicular to the longitudinal axis 104 and in contact with the base cylinder 102, wherein the two or more vertical strength members 123 are disposed substantially against the outer surface 116 adjacent the outer surface 116 minima radius 120 within a corrugation 114, and wherein the two or more vertical strength members 123 are stabilized in at least a dimension perpendicular to the longitudinal axis 104 by the corrugation 114.

According to an example implementation, the vertical support structures 122 124 may include a first horizontal support structure 126 in communication with the first vertical support structure 122 and a second horizontal support structure 128 in communication with the second vertical support structure 124. According to an example implementation, the horizontal support structures 126 128 may be disposed substantially perpendicular to the longitudinal axis 104 and above the base cylinder 102. In an example implementation, the horizontal support structures 126 128 may be stabilized in at least a dimension parallel to the longitudinal axis 104 by interaction of the vertical support structures 122 124 with at least one of the plurality of corrugations 114.

According to an example implementation, the system 100 may include one or more upper troughs 103 supported by the horizontal support structures 126 128. The one or more upper troughs 103 may be disposed in a substantially horizontal position above the base cylinder 102. Certain example implementations may include one or more transverse support planks 160 connected to the horizontal support structures 126 128, and that may provide additional support to the one or more upper troughs 103.

According to an example implementation, a longitudinal trough support 162 may be utilized under each upper trough 103 to provide horizontal support for the upper trough 103 along the longitudinal axis 144, for example, so that the upper troughs 103 wont excessively sag between supports, and to provide additional stability to the system 100. In certain example embodiments, the one or more transverse support planks 160 may provide a convenient support and connection base with one or more of the longitudinal trough supports 162.

As discussed above, the one or more upper troughs 103 may be utilized for various function associated with plant growth, including but not limited to clarification of nutrient-rich water 130, containing growing beds, supporting plants, etc. According to certain example embodiments the upper troughs 103 may provide bio-filtering for ammonia and nutrient rich water 130 and for growing plants in rock media or NFT without rocks. With rock media, the plants may include seedlings either directly sown or seedlings or plant cuttings of a variety of plants including microgreens, wheat-grass, lettuces, flowering, herbs, strawberries, etc.

In one example embodiment, the one or more upper troughs 103 may be made from at least a portion of a longitudinal section of a substantially hollow elongated cylinder having end caps and a longitudinal axis 144 extending substantially from a first end 106 to a second end 108 of the troughs 103. The troughs 103 may be disposed in a substantially horizontal position.

According to an example implementation, the one or more upper troughs 103 may define an inner surface 132 having an inner radius 142 and an outer surface 138 defining a plurality of corrugations 136. The outer surface corrugations 136 may include a maxima radius 134 and a minima radius 142 disposed periodically along the longitudinal axis 144.

According to an example implementation, the system 100 may include one or more base stabilizers 150 in communication with at least one of the vertical support structures 122 124. In one example embodiment, the one or more base stabilizers 150 may operate to constrain at least one of the vertical support structures 122 124 axially about the longitudinal axis 104.

Also depicted in FIG. 1 is a valve assembly 700 that will be further discussed in detail below with reference to FIGS. 6-9.

Figure 2:
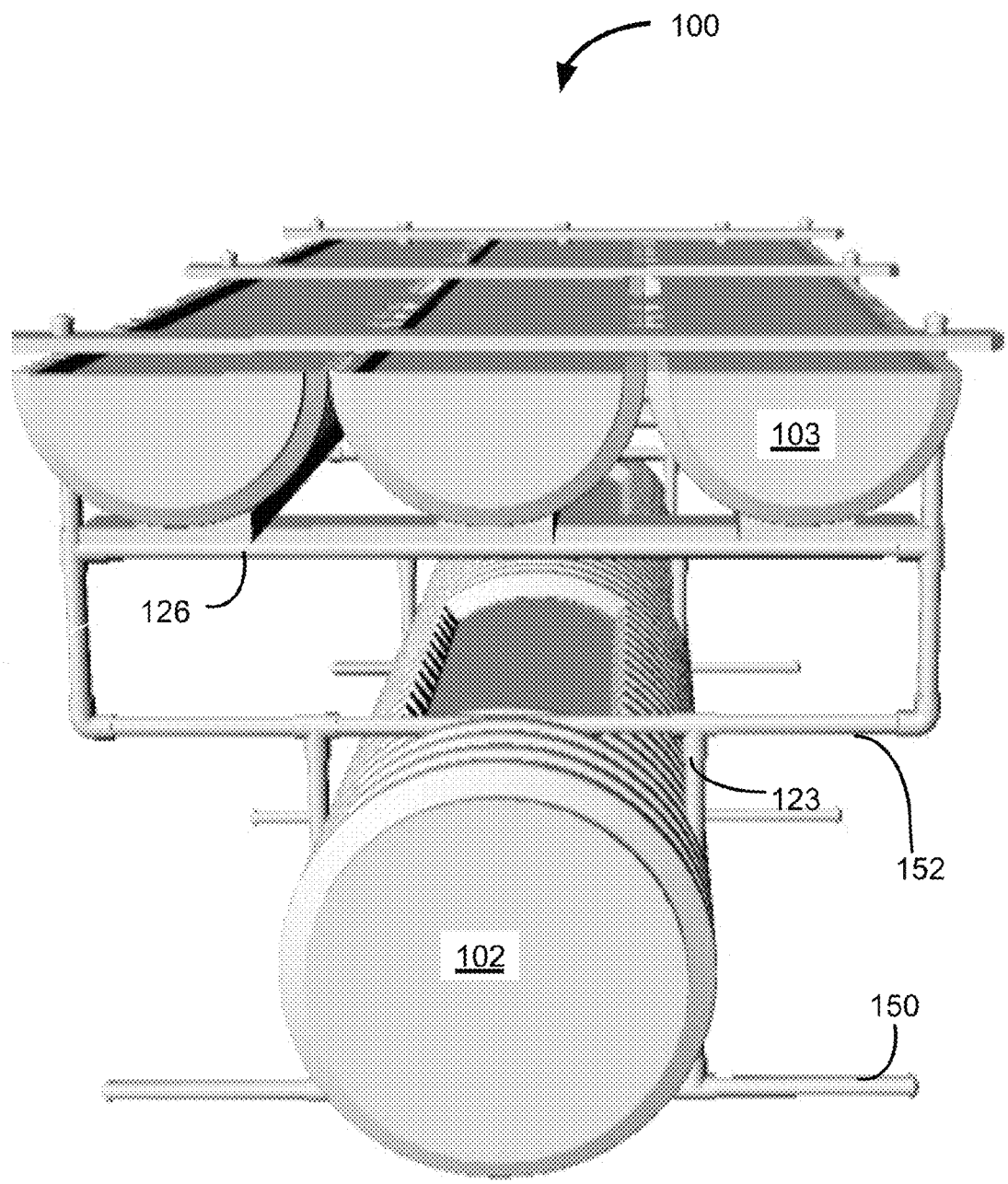
FIG. 2 is an end-view perspective rendering of the system of FIG. 1.

FIG. 2 depicts end-view perspective of the system 100 of FIG. 1, with the end view perspective of the base cylinder 102 supported above one or more upper troughs 103 by a horizontal support structure 126 in communication with the horizontal retaining members 152 and the two or more vertical strength members 123. Note in this figure that the two or more vertical strength members 123 and the horizontal retaining members 152 are disposed substantially within the corrugations of the base cylinder 102, and are constrained by the corrugations.

Figure 3:
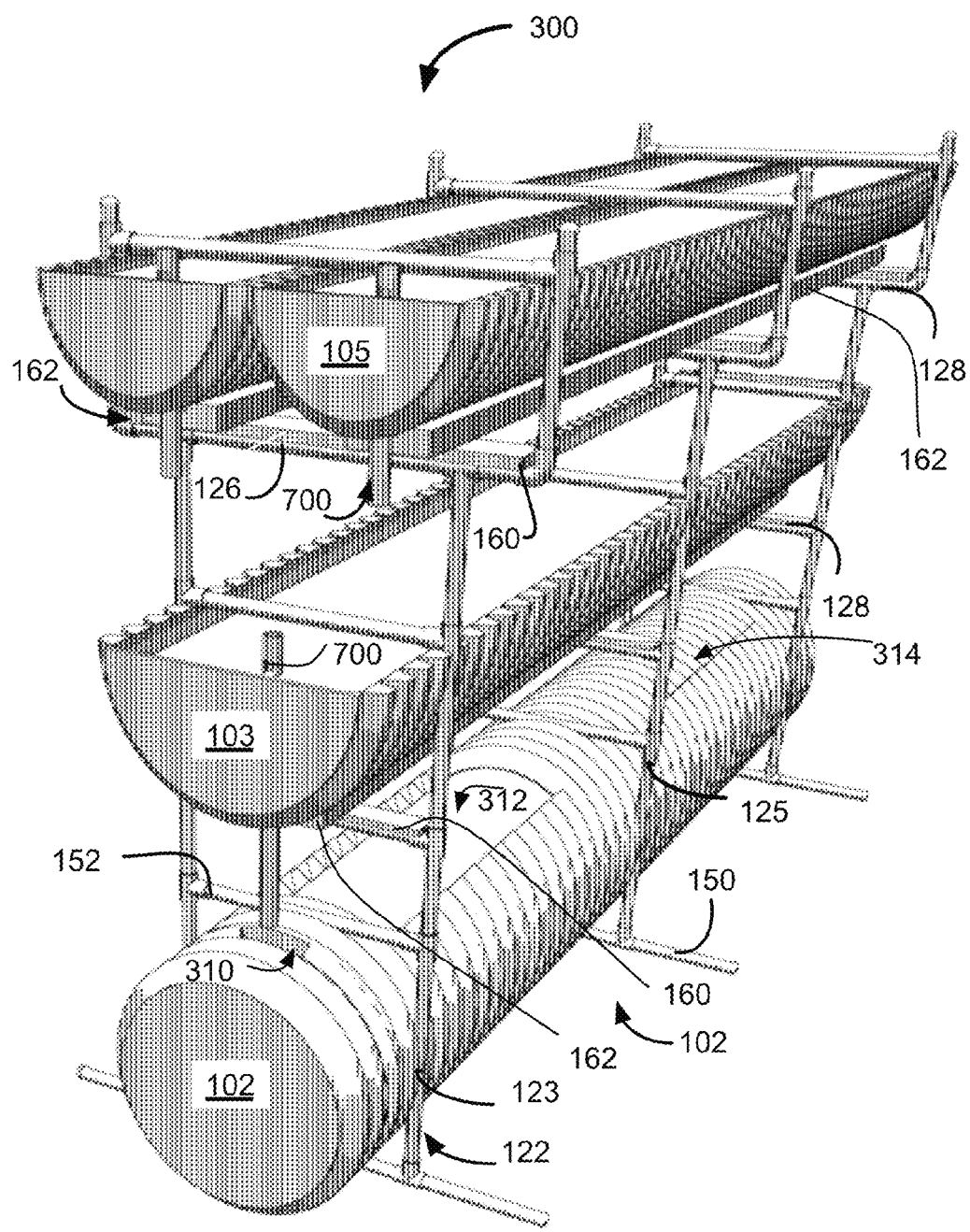
FIG. 3 is a perspective rendering of a three-level system for extracting and distributing nutrients from biomass for plant growth, according to an example implementation of the disclosed technology.

FIG. 3. Depicts a 3-level system 300 according to an example implementation of the disclosed technology. This example embodiment includes one or more top troughs 105 disposed in a substantially horizontal position above the base cylinder 102 and the upper troughs 103. In an example implementation, the one or more top troughs 105 may provide a similar plant growing function as described above with reference to the upper troughs 103 of system 100 in FIG. 1. According to certain example embodiments, the upper troughs 103 of system 300 in FIG. 3 may be utilized for clarifying the nutrient-rich water 130 rather than growing plants. In yet another example embodiment, the upper troughs 103 of system 300 in FIG. 3 may be utilized for growing plants.

According to an example implementation, the system 300 may further include one or more longitudinal trough supports 162 extending parallel with, and under the one or more top troughs 105. In one embodiment, the one or more longitudinal trough supports 162 may be in communication with at least one of the horizontal support structures 126 128 and configured to support at least a portion of the one or more upper troughs 103 in a substantially horizontal position, and to prevent sagging.

In and example embodiment, the system 300 may include many or all of the components as describe above with reference to FIG. 1. For example, the system 300 may include vertical support structures 122 124 that include one or more horizontal retaining members 152 disposed in a substantially horizontal position and adjacent to portion of the base cylinder 102, the one or more horizontal retaining members 152 connecting the two or more vertical strength members 123, wherein the one or more retention members 152 retain the two or more vertical strength members 123 against the base cylinder outer surface. In an example implementation, at least one of the one or more retention members 152 are disposed substantially against the outer surface of at least a base cylinder 102 and adjacent to the minima radius 142 within at least one corrugation 114, and wherein the one or more retention members 152 are stabilized in at least one dimension by the corrugation 114.

FIG. 3 further depicts options for openings in the base cylinder 102 according to an example implementation. For example, a recycling or drainage opening 310 may provide a convenient opening in the base cylinder 102 for draining or recycling fluids from the upper trough 103 via a valve assembly 700 (which will be discussed with reference to FIGS. 6-9 below). In an example implementation, the base cylinder 102 may include a base cylinder access opening 312 to provide easy access to the inner portion of the base cylinder 102, for example, to fill the base cylinder 102 with water, add biomass, etc., and to clean out the base cylinder 102. In an example implementation, an access opening cover 314 may be utilized to selectively open or close the base cylinder access opening 312.

Figure 4:
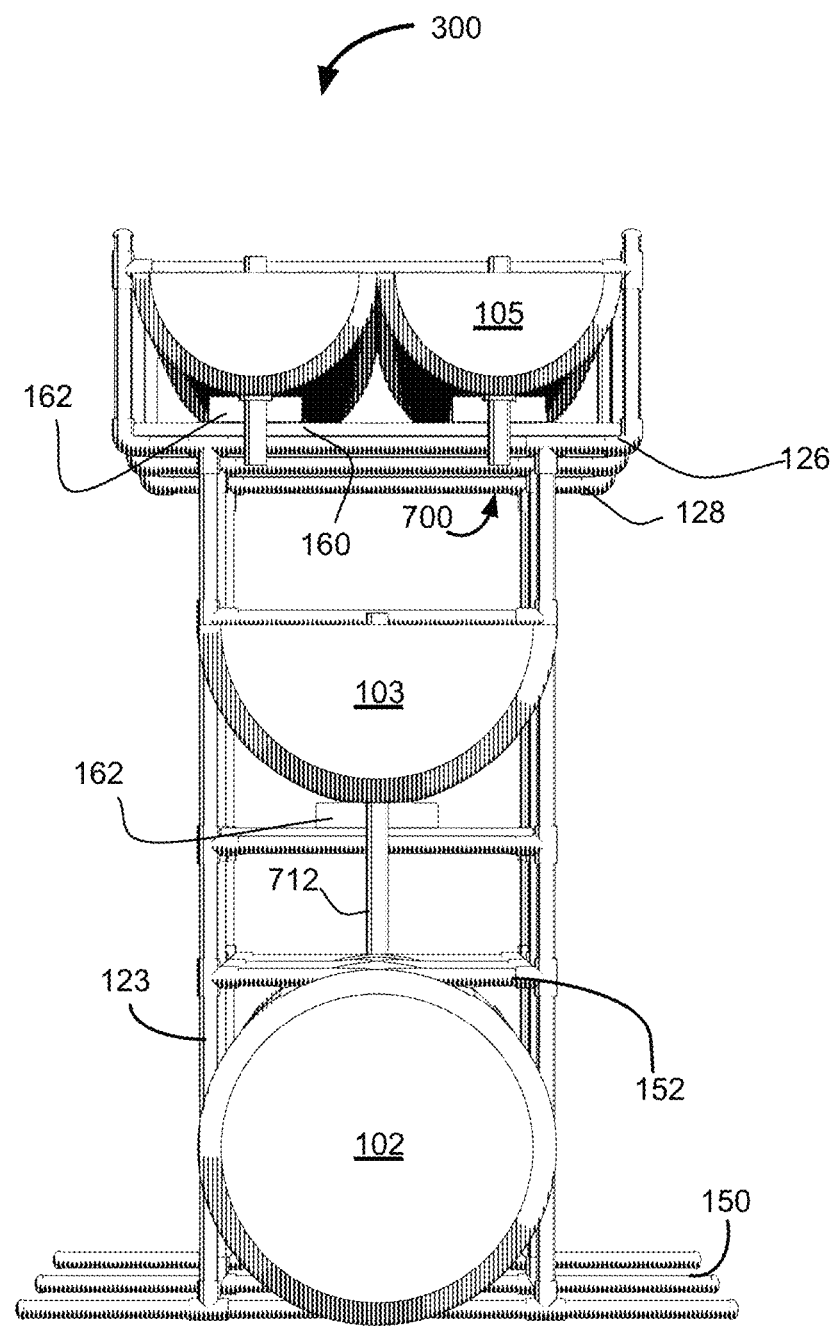
FIG. 4 is an end-view perspective rendering of the system of FIG. 3.

FIG. 4 depicts an end perspective view of the system 300 as depicted in FIG. 3. In an example implementation, and as shown, an exit tube 712 associated with the valve assembly 700 may be utilized to conveniently direct drainage water from the upper trough 103 to the base cylinder 102.

Figure 5:
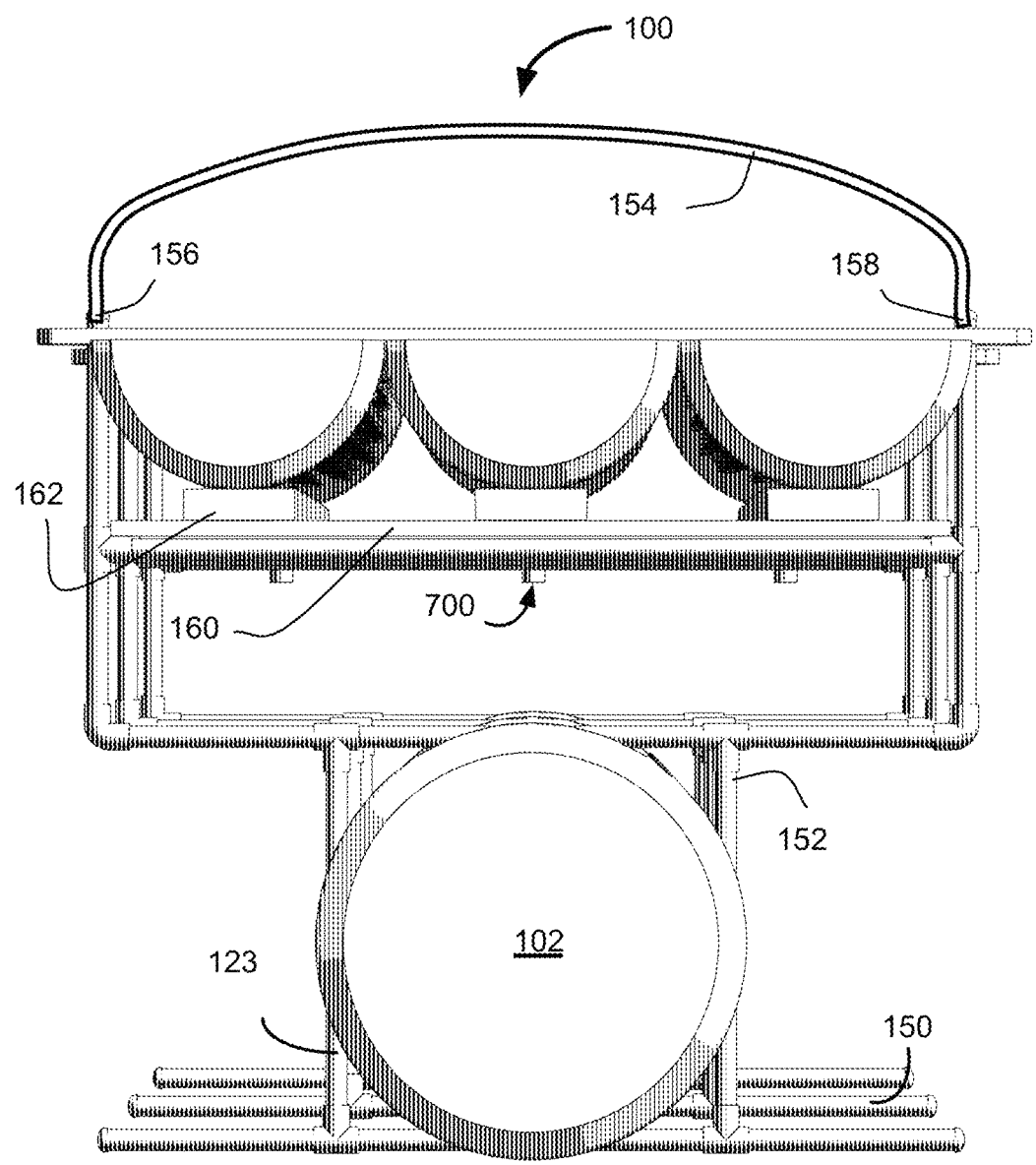
FIG. 5 is an end-view perspective rendering of the two-level system of FIG. 1 with hoop attachments shown, according to an example implementation of the disclosed technology.

FIG. 5 depicts another end view perspective example embodiment of the system 100 similar to the embodiments shown in FIGS. 1 and 2. In this example embodiment, the system 100 includes one or more flexible canopy hoops 154, where each of the one or more flexible canopy hoops 154 has a first hoop end 156 and a second hoop end 158. In an example implementation, each of the hoop ends 156 158 are configured for insertion into at least a portion of a corrugation 136 associated with the upper trough 103 or the top trough 105. For example, a portion of the corrugation 136 (for example, see the corrugations 136 as shown in FIG. 1) is configured to constrain the hoop ends 156 158 in at least two dimensions. According to an example implementation, installing a plurality of canopy hoops 154 in the upper trough 103 or the top trough 105 may provide a convenient support for draping plastic sheeting, insulating material, or the like over the top of the system 100, for example, to protect plants from frost.

According to certain example embodiments of the disclosed technology, the support structures 122 124 125 and associated components may be utilized for further adding and supporting components above the upper troughs 103 or the top troughs 105. For example, additional vertical strength members 123 and horizontal support structures 126 may be added to support grow lights and other auxiliary items without departing from the scope of the disclosed technology.

According to certain example embodiments, for base cylinders 102, upper troughs 103, or the top troughs 105 troughs that are 15-inches in diameter and larger, the associated corrugations 114 136 may be wide enough for a ¾-inch pipe to nestle into the corrugation 114 136 and stabilize the associated structure attached to the pipe in least a dimensions parallel to the longitudinal axis 104. However, in another implementation involving base cylinders 102, upper troughs 103, or the top troughs 105 that are less than 15-inches in diameter, the corrugations 114 136 may not be wide enough for a ¾-inch pipe to adequately nestle into the corrugation 114 136 and stabilize the pipe at least a dimensions parallel to the longitudinal axis 104. For this reason, certain example embodiments may include about a ¾-inch thick by about 4-inch wide transverse support planks 160, which may be bolted or screwed to horizontal members 126 128. Certain example embodiments may include longitudinal support planks 162 made from approximately 2-inch thick by approximately 8-inch wide timber or other structural material that may be bolted or attached to the transverse support planks 160. This example embodiment may provide stability along the longitudinal axis and continuous support to the trough that may sag or buckle without such support. Other types of material such as plastic, steel, etc could be used in lieu of wood without departing from the scope of the disclosed technology.

Valve Assembly

Figure 6:
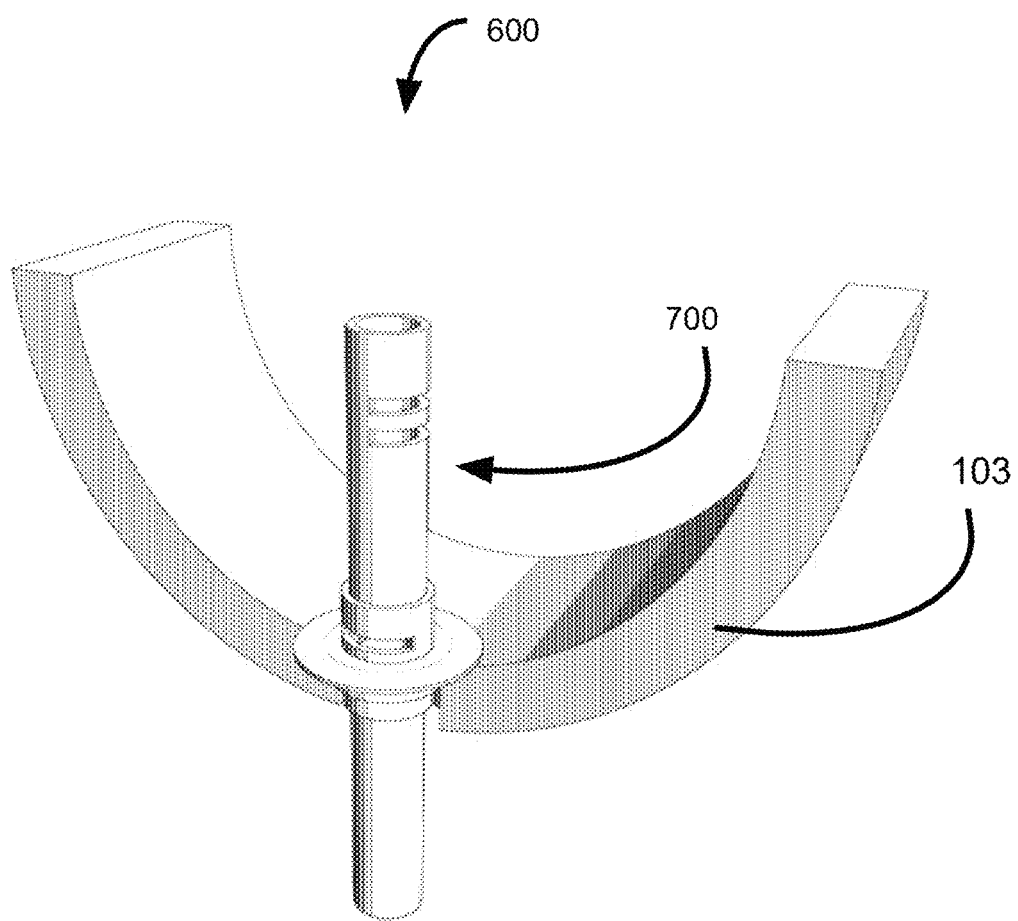
FIG. 6 is a perspective view of an adjustable drain valve, according to an example implementation of the disclosed technology.

FIG. 6 depicts a perspective view of a system 600 that may include a trough 103 (a cutaway view is shown here for clarity) with valve assembly 700 that extends through a portion of the trough 103. Example embodiment of the valve assembly 700 may be utilized for selectable control of fluid drainage, for example, as discussed above with reference to the upper troughs 103, or the top troughs 105. Several notable features of the valve assembly 700, according to an embodiment of the disclosed technology, enable selectively containing fluids, or draining of nearly all of the fluid out of the troughs, and adjusting flow rates by a simple rotation of a member. These and other features will become apparent with the following descriptions and associated figures.

Figure 7:
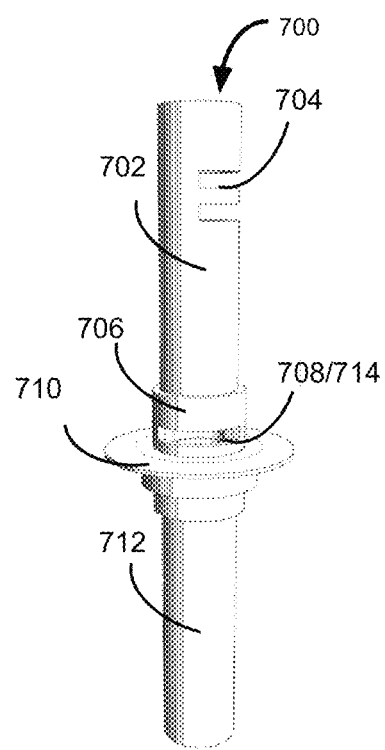
FIG. 7 is an assembled view of an adjustable drain valve assembly, according to an example implementation of the disclosed technology.
Figure 8:
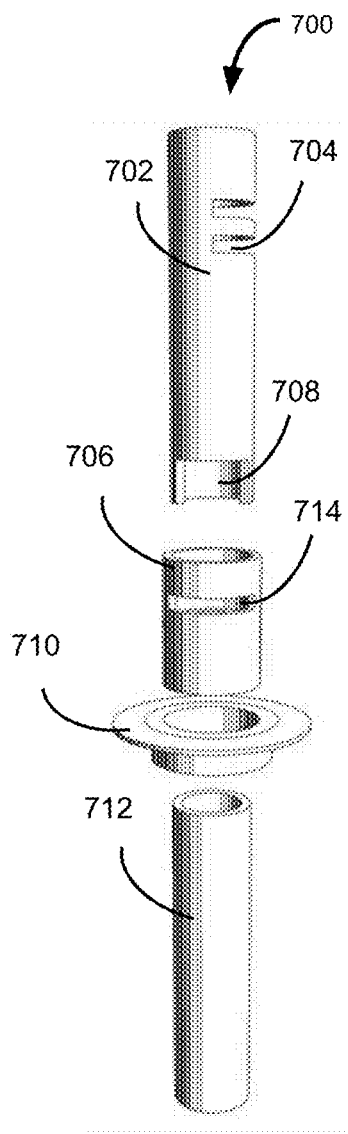
FIG. 8 is an exploded view of the adjustable drain valve assembly, according to an example implementation of the disclosed technology.

FIG. 7 depicts an assembled view of an adjustable drain valve assembly 700, according to an example implementation of the disclosed technology. FIG. 8 is an exploded view of the adjustable drain valve assembly 700, according to an example implementation of the disclosed technology. In an example implementation, the adjustable drain valve assembly 700 includes a low-profile seal 710 having an inner cylindrical seal body and an outer annular surface sealing portion. The outer annular surface sealing portion is configured for continuous sealing contact with at least an outer surface of the cylindrical seal body. The low profile seal 710 may provide a water tight seal between certain adjustable drain valve assembly 700 components and at least a portion of a hole cut in the upper troughs 103 and/or the top troughs 105. The minimal thickness of seal material associated with the low-profile seal 710 protruding above the inner surface of the upper troughs 103 and/or the top troughs 105 enables placement of the drain orifice of the adjustable drain valve assembly 700 to be nearly flush with the inner surface of the upper troughs 103 and/or the top troughs 105, thereby allowing nearly all of the water contained in the upper troughs 103 and/or the top troughs 105 to be drained out as needed.

In accordance with an example implementation, the adjustable drain valve assembly 700 includes a drain orifice member 706 having a hollow cylindrical orifice body. The drain orifice member 706 may be configured for mating and continuous sealing contact with at least an inner surface of the low-profile seal 710. The drain orifice member 706 may include at least one orifice 714 extending through a wall of the cylindrical orifice body between an outer portion and an inner portion of the cylindrical orifice body. In accordance with an example implementation, the adjustable drain valve assembly 700 further includes a drain control member 702, having a hollow cylindrical drain control body. The drain control member 702 may be configured for mating and continuous rotatable sealing contact with at least a portion of an inner surface of the drain orifice member 706. The drain control body may include at least one control opening 708 extending through a portion of the drain control body and disposed at a first end of the drain control body. The at least one control opening 708 may be configured, upon rotation, to selectively control fluid flow through the at least the one orifice 714 associated with the drain orifice member 706. In accordance with an example implementation, the outer annular surface sealing portion associated with the low-profile seal 710 may be further configured for continuous sealing contact with at least a portion of surface associated with a continuous hole in a trough 103. In accordance with an example implementation, the orifice 714 associated with the drain orifice member 706 includes one or more horizontal slits. In an example implementation, the one or more horizontal slits are configured to block debris while allowing fluid to flow through the slits.

In accordance with an example implementation, the adjustable drain valve assembly 700 further includes a substantially hollow cylindrical exit tube 712. The exit tube 712 may be configured for mating and continuous sealing contact with at least an inner surface of the drain orifice member 706. In an example implementation, the exit tube 712 may be further configured for directing fluid after it passes through the valve assembly.

In accordance with an example implementation, drain control member 702 further includes at least one orifice disposed substantially near a second end of the cylindrical orifice body and extending through a wall of the cylindrical orifice body between an outer portion and an inner portion of the cylindrical orifice body. In an example implementation, the at least one orifice associated with the drain control member 702 includes one or more horizontal slits, wherein the one or more horizontal slits are configured to block debris while allowing fluid to flow through the slits. According to an example implementation, the control opening extending through a portion of the drain control member 702 is continuous with the first end of the cylindrical orifice body.

Figure 9:
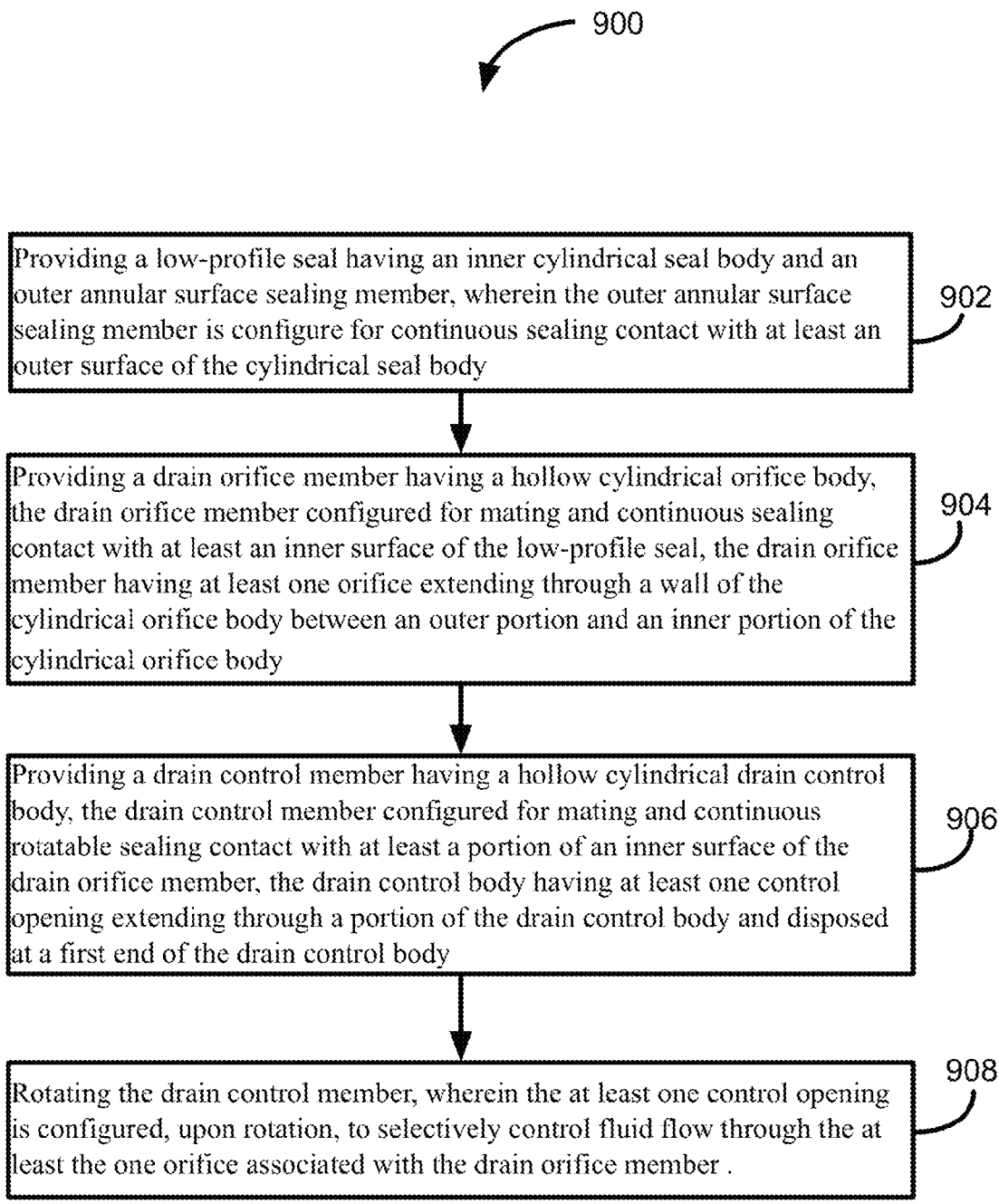
FIG. 9 is a flow diagram of an example method according to an example embodiment of the disclosed technology.

FIG. 9 depicts a method flow-diagram 900 for selectable control of a fluid level in a trough. The method begins in block 902, and according to an example implementation, includes providing a low-profile seal having an inner cylindrical seal body and an outer annular surface sealing portion, wherein the outer annular surface sealing portion is configure for continuous sealing contact with at least an outer surface of the cylindrical seal body. In block 904, and according to an example implementation, the method includes providing a drain orifice member 706 having a hollow cylindrical orifice body, the drain orifice member configured for mating and continuous sealing contact with at least an inner surface of the low-profile seal, the drain orifice member having at least one orifice extending through a wall of the cylindrical orifice body between an outer portion and an inner portion of the cylindrical orifice body.

In block 906, and according to an example implementation, the method includes providing a drain control member, having a hollow cylindrical drain control body, the drain control member configured for mating and continuous rotatable sealing contact with at least a portion of an inner surface of the drain orifice member, the drain control body having at least one control opening extending through a portion of the drain control body and disposed at a first end of the drain control body. In block 908, and according to an example implementation, the method includes rotating the drain control member, wherein the at least one control opening is configured, upon rotation, to selectively control fluid flow through the at least the one orifice associated with the drain orifice member.

Additional embodiments of the method may include providing at least one orifice disposed substantially near a second end of the cylindrical orifice body and extending through a wall of the cylindrical orifice body between an outer portion and an inner portion of the cylindrical orifice body. In one example embodiment, providing the least one orifice associated with the drain control member includes providing one or more horizontal slits, wherein the one or more horizontal slits are configured to block debris while allowing fluid to flow through the slits. In an example implementation, the control opening extending through a portion of the drain control body is continuous with the first end of the cylindrical orifice body.

Certain embodiments of the disclosed technology are described above with reference to block and flow diagrams of systems and according to example embodiments of the disclosed technology. Likewise, some blocks of the block diagrams and flow diagrams may not necessarily need to be performed in the order presented, or may not necessarily need to be performed at all, according to some embodiments of the disclosed technology.

Example embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An apparatus for supporting a multi-level system for extracting and distributing nutrients from biomass for plant growth, the apparatus comprising:
   two or more support structures (122 124), each support structure (122 124) comprising:
      two or more vertical strength members (123) disposed substantially vertically on opposing sides of a corrugated base cylinder (102), wherein the two or more vertical strength members (123) are disposed substantially against an outer surface (116) of the base cylinder (102) and substantially perpendicular to a longitudinal axis (104) of the base cylinder (102), and wherein the two or more vertical strength members (123) are stabilized in at least a dimension perpendicular to the longitudinal axis (104) by at least one corrugation (114) associated with the base cylinder (102); and
      two or more horizontal retaining members (150 152) in communication with the respective two or more vertical strength members (123) and operable to secure the two or more vertical strength members (123) against the base cylinder (102), wherein the horizontal retaining members (150 152) are disposed substantially perpendicular to the longitudinal axis (104) and are disposed on opposing sides of the base cylinder (102), and wherein the horizontal retaining members (150 152) are stabilized in at least a dimension parallel to the longitudinal axis (104) by interaction with at least one of the plurality of corrugations (114); and one or more upper troughs (103) supported by the two or more horizontal retaining members (150 152) and disposed in a substantially horizontal position above the base cylinders (102), wherein the base cylinder (102) further comprises a base cylinder access opening for draining or recycling fluids from the one or more upper troughs (103), and wherein a valve assembly extends through a portion of the one or more upper troughs (103) for selectively controlling fluid drainage out of the one or more upper troughs (103), and wherein the valve assembly comprises at least one orifice having one or more horizontal slits configured to block debris while allowing fluid to flow through the one or more horizontal slits when draining fluid out of the one or more upper troughs (103), and wherein the valve assembly further comprises at least one control opening that may be rotated to selectively control fluid flow through the at least one orifice.

2. The apparatus of claim 1, wherein the base cylinder (102) comprises a substantially hollow elongated base cylinder (102) having the longitudinal axis (104) extending from a first end (106) to a second end (108) and disposed in a substantially horizontal position, the base cylinder (102) defining an inner surface (110) having an inner radius (112) about the longitudinal axis (104) and a plurality of corrugations (114) defining an outer surface (116), the corrugations (114) comprising maxima (118) radius and minima (20) radius disposed periodically along the longitudinal axis (104).

3. The apparatus of claim 1, wherein the one or more upper troughs 103 comprise at least a longitudinal section of a substantially hollow elongated cylinder having a longitudinal axis (144) extending substantially from a first end (106) to a second end (108) and disposed in a substantially horizontal position, the one or more upper troughs (103) defining an inner surface (321) having an inner radius (142) and a plurality of corrugations (136) defining an outer surface (138) comprising maxima radius (341) and a minima radius (142) disposed periodically along the longitudinal axis (144).

4. The apparatus of claim 1, wherein at least one the horizontal retaining member (150) comprises one or more base stabilizers in communication with at least one of the vertical support structures (122 124), and wherein the one or more base stabilizers operate to constrain at least one of the vertical support structures (122 124) axially about the longitudinal axis (104) and in a substantially vertical position.

5. The apparatus of claim 1, further comprising a first horizontal support structure (126) in communication with the first vertical support structure (122) and a second horizontal support structure (128) in communication with the second vertical support structure (124), wherein the horizontal support structures (126 128) are disposed substantially perpendicular to the longitudinal axis (104) and are disposed substantially above the base cylinder (102), and wherein the horizontal support structures (126 128) are stabilized in at least a dimension parallel to the longitudinal axis (104) by interaction of the vertical support structures (122 124) with at least one of the plurality of corrugations (114).

6. The apparatus of claim 5, further comprising one or more longitudinal trough support members (162) extending from the first end (106) to the second end (108), the one or more longitudinal trough support members (162) in communication with at least one of the horizontal support structures (126 128) and configured to support at least a portion of the one or more upper troughs (103) in a substantially horizontal position.

7. The apparatus of claim 5, further comprising:
one or more top troughs (105) disposed in a substantially horizontal position above the base cylinder (102);
one or more transverse support planks (160) in communication with at least one of the horizontal support structures (126 128);
one or more longitudinal trough support members (162) extending from the first end (106) to the second end (108), the one or more longitudinal trough support members (162) in communication with at least one of the one or more transverse support planks (1601 or at least one of the horizontal support structures (126 128), the one or more longitudinal trough support members (162) further configured to support at least a portion of the one or more top troughs (105) in a substantially horizontal position.

8. The apparatus of claim 1, further comprising a third vertical support structure (125) disposed approximately between first end (106) to the second end (108) wherein the third vertical support structures (125) comprises two or more vertical strength members (123) disposed substantially on opposing sides of the base cylinder (102) and perpendicular to the longitudinal axis (104) and in contact with the base cylinder (102), wherein the two or more vertical strength members (123) are disposed substantially against the outer surface (116) adjacent the outer surface (116) minima radius (120) within a corrugation (114), and wherein the two or more vertical strength members (123) are stabilized in at least a dimension perpendicular to the longitudinal axis (104) by the corrugation (114).

9. The apparatus of claim 1, further comprising one or more top troughs (105) disposed in a substantially horizontal position above the base cylinder (102) and the one or more upper troughs (103).

10. The apparatus of claim 1, wherein the base cylinder (102) is made from materials comprising one or more of high-density polyethylene (HDPE), polyvinyl chloride (PVC), metal, plastic, wood, and concrete.

11. The apparatus of claim 1, wherein the two or more support structures (122 124), are made from materials comprising one or more of aluminum pipe, galvanized steel pipe, fiberglass, and iron.

* * * * *